United States Patent [19]

Goldstein et al.

[11] Patent Number: 5,526,178

[45] Date of Patent: * Jun. 11, 1996

[54] BINOCULAR

[75] Inventors: Pinchas Goldstein, Jerusalem, Israel; Charles S. Naiman; Harry S. Miller, both of Brookline, Mass.

[73] Assignee: Front-Row Products Inc., Wilmington, Del.

[*] Notice: The portion of the term of this patent subsequent to Jan. 25, 2011, has been disclaimed.

[21] Appl. No.: 186,335

[22] Filed: Jan. 25, 1994

Related U.S. Application Data

[63] Continuation-in-part of Ser. No. 840,262, Feb. 24, 1992, Pat. No. 5,282,086.

[30] Foreign Application Priority Data

Feb. 22, 1991 [IL] Israel ......................................... 097330

[51] Int. Cl.⁶ ........................................................ G02B 23/18
[52] U.S. Cl. ........................... 359/407; 359/399; 359/408
[58] Field of Search .............................. 359/399, 400, 359/408–411, 480, 481; 351/57, 155; 2/10, 199, 422, 209.1

[56] References Cited

U.S. PATENT DOCUMENTS

| | | | |
|---|---|---|---|
| 2,598,145 | 5/1952 | Steadman, Jr. | 359/410 |
| 2,649,019 | 8/1953 | Hartline et al. | 359/409 |
| 2,935,910 | 5/1960 | Schmidt | 359/481 |
| 3,016,542 | 1/1962 | Lindblom | 351/44 |
| 3,088,367 | 5/1963 | Haupt et al. | 359/409 |
| 3,865,468 | 2/1975 | Holcomb | 359/409 |
| 4,239,352 | 12/1980 | Dockal | 351/57 |
| 4,449,787 | 5/1984 | Burbo et al. | 359/411 |
| 4,541,125 | 9/1985 | Phillips | 2/10 |
| 4,651,951 | 3/1987 | McFarlane | 359/409 |
| 4,670,912 | 6/1987 | Hart | 2/209.1 |
| 4,734,939 | 4/1988 | Copp | 2/422 |
| 4,819,274 | 4/1989 | Day | 2/10 |
| 4,834,525 | 5/1989 | Vansaghi | 351/57 |
| 4,839,926 | 6/1989 | Choi | 2/199 |
| 4,886,340 | 12/1989 | Kanda | 359/411 |
| 4,929,075 | 5/1990 | Eliakim | 351/57 |
| 4,951,316 | 8/1990 | Moody | 2/10 |
| 4,971,429 | 11/1990 | Ishido et al. | 359/409 |
| 5,037,192 | 8/1991 | Arad | 351/57 |
| 5,181,139 | 1/1993 | Benitez | 359/410 |
| 5,282,086 | 1/1994 | Goldstein | 359/408 |

FOREIGN PATENT DOCUMENTS

| | | |
|---|---|---|
| 949038 | 8/1949 | France . |
| 4004248 | 8/1990 | Germany . |
| 74869 | 4/1990 | Israel . |
| 86-5368 | 9/1986 | WIPO . |
| 90-3741 | 4/1990 | WIPO . |

*Primary Examiner*—Thong Q. Nguyen
*Attorney, Agent, or Firm*—Greenblum & Bernstein

[57] ABSTRACT

A binocular mountable on a headgear, includes two optical systems, one for each eye of the user. Each system includes at least an objective lens and an eyelens. The binocular is pivotably attached to the headgear. When the headgear is in position on the user's head, the objective lenses and the eye lenses can be quickly swiveled out of the way to facilitate free and unaided vision, and returned to the position of binocular-aided vision. The binocular optical systems can be configured to provide either telescopic or microscopic effects. Moreover, the mounts of the lenses are transparent and integrally formed with the respective lenses. Thus, a continuity of visual field without "tunnel" vision is achieved. Hook and loop type fasteners can be used to attach the optical systems to the headgear, which can be either a cap or a visor. Additionally, a laser light/sun light shield can be provided. The optical systems can define bifocal optical systems. A single optical system (i.e., for one eye of the user) can also be mounted to a headgear.

22 Claims, 9 Drawing Sheets

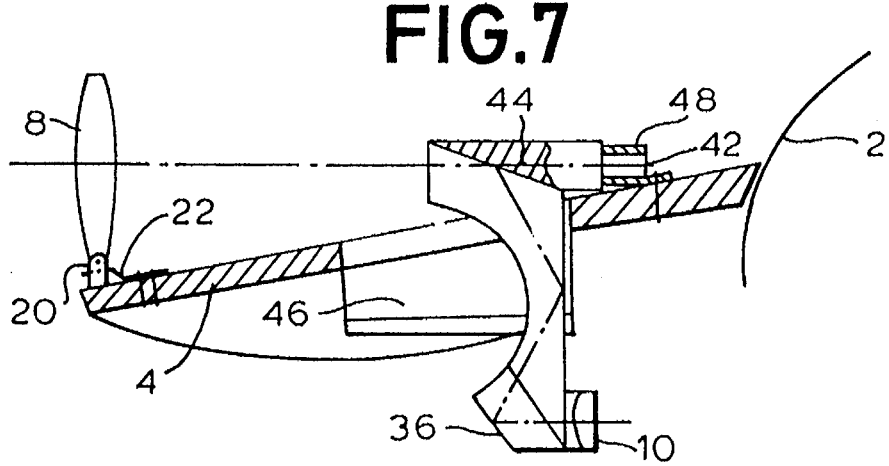
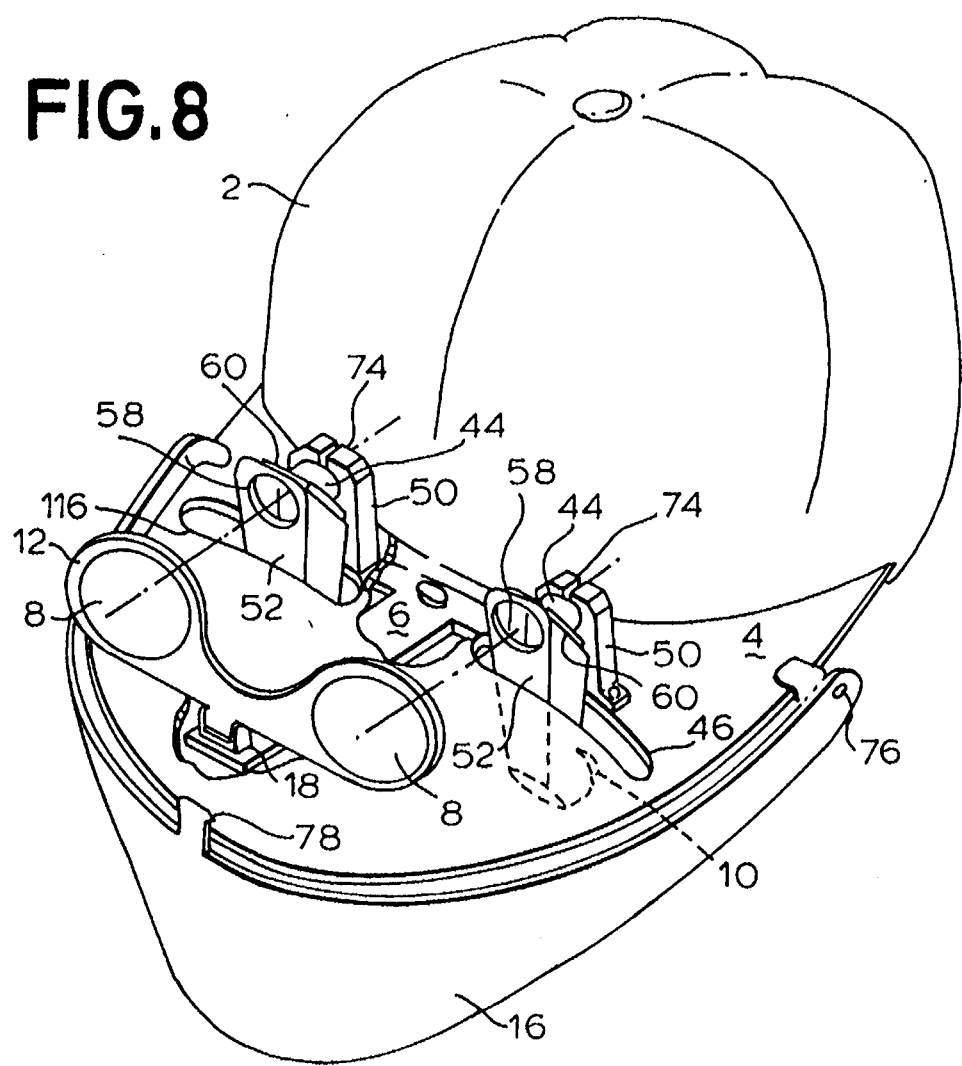

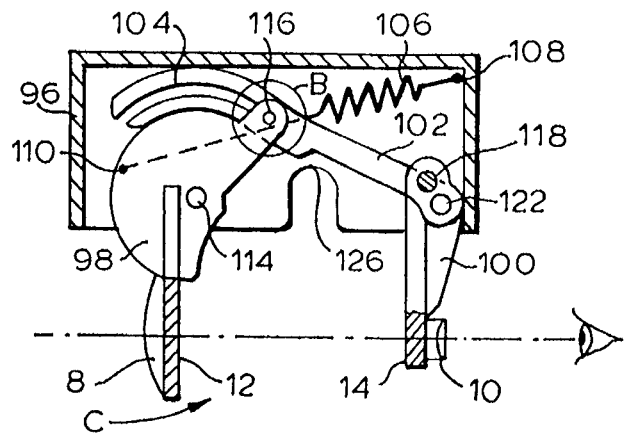
FIG.11
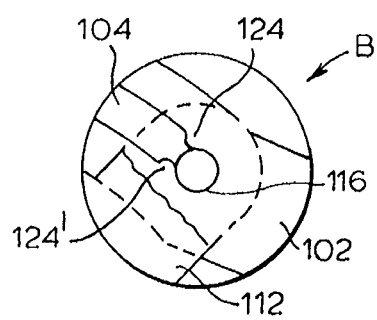
FIG.16
FIG.12   FIG.13
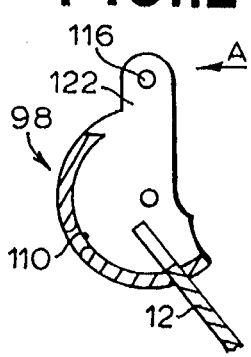 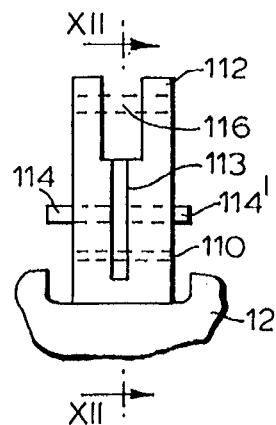
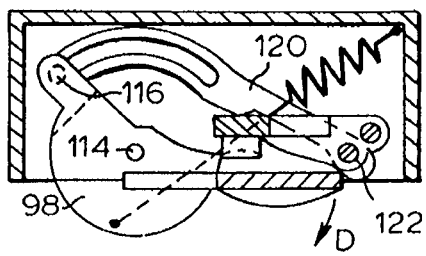
FIG.17
FIG.14   FIG.15
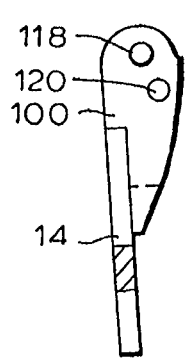 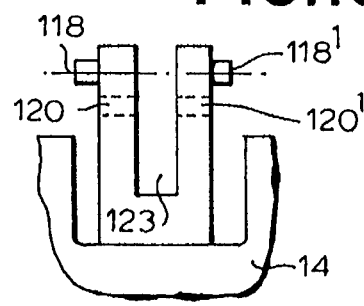

BINOCULAR

BACKGROUND OF THE INVENTION

1. Field of the Invention

The present application is a continuation-in-part of U.S. Ser. No. 07/840,262, filed Feb. 24, 1992, now U.S. Pat. No. 5,282,086, the entire disclosure of which is explicitly incorporated herein by reference in its entirety.

The present invention relates to a binocular, and particularly to a binocular mountable on a headgear such as a visor, a visored cap or a helmet, and more particularly to binoculars thus mounted that can be quickly and easily folded out of the way to facilitate free and unaided vision.

Binoculars are widely used in theater, opera and concert performances; in spectator sports, biking, bird-watching and the like. Binocular-like magnifying devices are also used in a wide variety of medical, industrial, research and commercial environments. Prolonged use, however, is liable to cause both eye strain because of the unsteadiness of the image caused by hand-held binoculars and physical discomfort due to muscular fatigue of the raised arms.

The term "binocular" as utilized in the present invention, is intended to designate any optical instrument utilizing two optical systems, one for each eye of the user, whether providing telescopic or microscopic vision. As noted above, such binoculars are also used widely in industrial applications, in research and in the medical/surgical field. The above disadvantages of binoculars apply to these uses, and the present invention is applicable to and finds use in each of the above fields, as well as in other fields.

Moreover, although the term binocular is used throughout the present application, it is expressly within the scope of the instant disclosure that each of the various embodiments of the invention described can be applied to a monocular. In other words, it is with the scope of the present invention that the benefits and advantages thereof can be obtained by the use of an optical system for only one eye of a user attached to a headgear.

It is one of the objects of the present invention to overcome the above difficulties and to provide a binocular that can be used without the need for support by one's arms and hands, yet is removable from before one's eyes by a flip of one's hand and is as easily returned to the viewing position.

According to the present invention, this is achieved by providing a binocular mountable on a headgear, comprising two optical systems, one for each eye of the user, each system including at least an objective lens and an eyelens, and a mechanism to attach the optical systems to the headgear, including pivot mechanism by which, with the headgear in position on a user's head, the objective lenses and the eye lenses can be swiveled out of the way to facilitate free and unaided vision, and returned to the position of binocular-aided vision.

The binocular can be attached to the headgear by a hook and loop type fastener, such as VELCRO™, rivets or any other conventional permanent or detachable attaching mechanism.

SUMMARY OF THE INVENTION

In fulfillment of the above objectives, the present invention relates to a binocular mountable on a headgear. The binocular includes two optical systems, one for each eye of the user, wherein each system defines an optical axis and includes at least an objective lens and an eye lens. Additionally, a mechanism is provided for attaching the systems to the headgear, including a pivot about which, with the headgear in position on a user's head, the objective lenses and the eye lenses can be swiveled outwardly away, to a first position for facilitating free and unaided vision and be returned to a second position, for providing binocular-aided vision. Additionally, a mechanism for mounting each objective lens and each eye lens of each optical system to the attaching mechanism is provided. The mounting mechanism includes a structure providing the function of enabling a continuity of vision to be maintained between a central field of view and a peripheral field of view.

The feature of the present invention that enables continuity of vision includes transparent frames for each of the objective lenses and eye lenses of each of the optical systems. Additionally, the mechanism for attaching the optical systems to the headgear can include a hook and loop type fastener mechanism. The binocular, according to the present invention, is arranged so as to enable the binocular to be worn by a user while wearing eyeglasses. Further, the headgear to which the binocular of the present invention is mounted, can be either a visor or a cap.

As a further feature of the present invention, a handle can be provided extending from the optical systems to facilitate type movement of the binocular between the first and second positions by a person other than a wearer/user of the binocular. Further, the binocular according to the present invention can include a shield for shielding a user from laser light and for shielding a user from sunlight. Such shield can be introducible into and removable from the optical axes of the optical systems.

According to yet another feature of the present invention, the optical lenses and the eye lenses of the optical systems can be formed as plastic lenses. Additionally, the objective lenses and the eye lenses of the optical systems of the present invention are mounted in lens mounts and the lens mounts are transparent. Furthermore, the objective lenses and eye piece lenses, and the lens mounts for each of the objective lenses and eye piece lenses can be formed as integrally molded plastic components.

According to a yet further feature of the present invention, the attachment mechanism for attaching the optical systems to the headgear can include a mechanism for sequentially moving the objective lenses and the eye lenses of the optical systems between the first and second positions for enabling selection of unaided vision or binocular-aided vision. Further, the sequential moving mechanism enables, upon movement of either of the objective lenses or the eye lenses, the automatic movement of the other of the lenses.

As yet a further feature of the present invention, the binocular according to the present invention can include a device attached to the headgear for enabling the headgear and the optical systems attached thereto, to be retained and to hang about the neck of the user when the headgear is not being worn. Additionally, the laser light and sunlight shielding mechanism can also include side protective shields for protecting a user from laser light and sunlight respectively, coming toward the user from the sides.

Each of the optical systems can, if desired, be formed as bifocal systems, with different magnifications obtained by the top and bottom portions of the optical systems.

Yet additionally, each of the optical systems of the binocular according to the present invention can define either a telescopic viewing system or a microscopic viewing system.

According to a yet further feature of the present invention, a binocular attachable to a headgear is provided. The binocular includes two optical systems, one for each eye of the user and each optical system defines an optical axis and includes at least an objective lens and an eye lens. Further, a mechanism is provided for attaching the systems to the headgear, including a pivot about which, with the headgear in position on the user's head, the objective lenses and the eye lenses can be swiveled out of the way, to a first position for facilitating free and unaided vision and returned to a second position for providing binocular aided vision. The binocular further includes a biasing mechanism for biasing the objective lens and the eye lens to the first position for facilitating free and unaided vision. Additionally, a pivotally mounted spacer member is provided and is mounted for pivoting movement between a position in which the biasing member moves the objective lenses and the eye lenses to the first position and another position in which the spacer member is interposed between the objective lenses and the eye lenses to overcome the biasing force of the biasing member, to move the objective lenses and the eye lenses to the second position.

The invention will now be described in connection with certain preferred embodiments, with reference to the following illustrative figures so that it may be more fully understood.

BRIEF DESCRIPTION OF THE DRAWINGS

With specific reference now to the figures in detail, it is stressed and emphasized that the particulars shown in the Figures are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several embodiments of the invention may be embodied in practice. In the drawings:

FIG. 7 illustrates another embodiment of the present invention with an erector prism, also permitting matching of the user's interpupillary distance;

FIG. 8 shows yet still another embodiment of the binocular according to the present invention, in which the axis-displacing element is a periscope-like structure;

FIG. 11 is a view, in cross-section, along plane XI—XI in FIG. 18, of a further embodiment of the binocular according to the present invention;

FIG. 12 is a view, in cross-section, along plane XII—XII in FIG. 13, of the drum-like member seen in FIG. 11;

FIG. 13 is a side view, in the direction of arrow A, of the drum-like member of FIG. 12;

FIG. 14 shows the arm which carries the eyelens frame;

FIG. 15 is a side view of the arm of FIG. 14;

FIG. 16 is a magnified view of detail B in FIG. 11;

FIG. 17 shows the embodiment of FIG. 11 in the folded state;

DETAILED DESCRIPTION OF THE INVENTION

Figure 1:
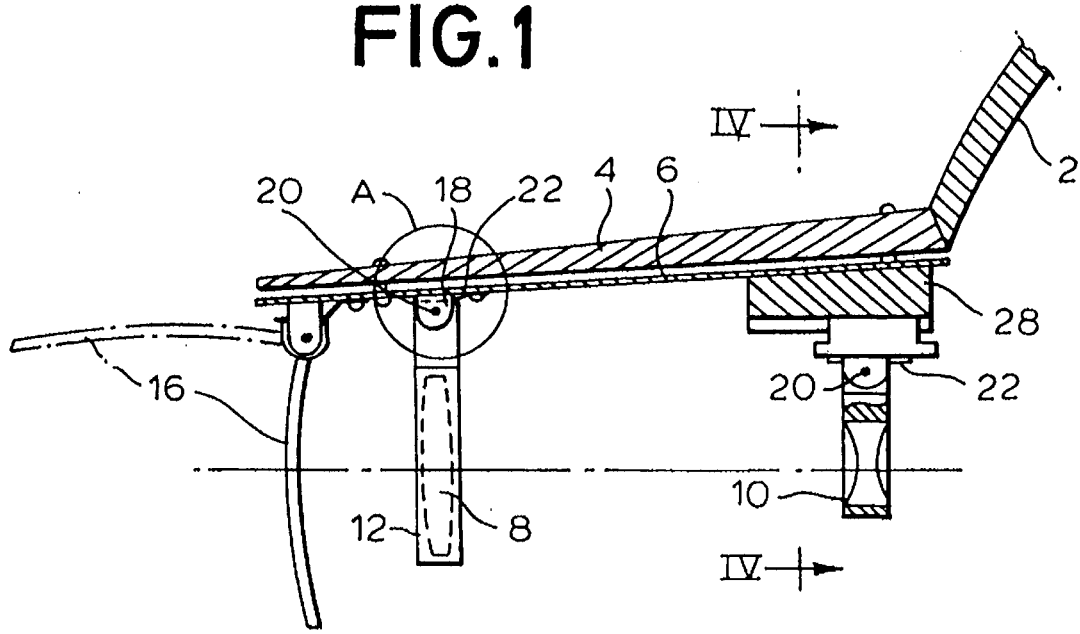
FIG. 1 is a median cross-section of a first embodiment of the binocular according to the present invention, as mounted on the visor of a cap, and in the unfolded, operational, binocular-aided vision state.

Referring now to the drawings, there is seen in FIG. 1, as an example of a headgear to which the binocular of the present invention can be attached, part of a cap 2 and its visor 4. To the latter is attached, preferably by means of a hook and loop fastener, or by any other conventional fastening means, such as by riveting, a base plate 6 which carries the optical systems of the binocular. There are obviously two optical systems to the binocular, although the present invention also encompasses a single optical system attachable to a headgear in accordance with the various disclosed embodiments. In the present embodiment, the binocular is a Galilean binocular, each system comprising a positive objective lens 8 and a negative eyelens 10 arranged in frames 12 and 14, respectively. The lenses 8 and 10 are advantageously made of a transparent plastic and are integrally molded with their respective, preferably transparent, frames 12 and 14 so that the lenses and lens frame comprise integrally molded plastic components. However, the lenses may also be made of glass and mounted in a conventional way. The lenses, or at least some of them, may be aspherical. The optical systems and the lenses making up the optical systems may be bifocal lenses.

As noted above, both the lenses and the transparent frames 12 and 14 can be integrally molded to form a single transparent member or component. This feature of the present invention provides significant and substantial advantages in that it enables continuity of eye contact, without a tunnel-vision effect, to be provided by the binocular of the present invention.

In conventional binoculars, wherein each of the objective lens and eye lens are mounted within an opaque cylindrical housing, the cylindrical housing provides tunnel effect which results in a discontinuity in the field of vision between the central, magnified portion, and the peripheral, unmagnified field of view of the user. This results in a loss of vision, in that a region of the field of view is obstructed by the cylindrical housings. This also results in a discontinuity in eye contact with the action, on the part of the user, and makes extended use of conventional binoculars uncomfortable.

Elimination of this tunnel effect and discontinuity of eye contact is a significant advantage of the present invention and results from the use of transparent frames integrally molded with transparent plastic lens components. As a result of this feature, use of the binoculars becomes very convenient and enables a user to follow action in both the central, magnified portion of his field of view, as well as in the peripheral, unmagnified portion of the field of view. The user is also enabled to smoothly follow action passing between these fields of view.

Figure 2:
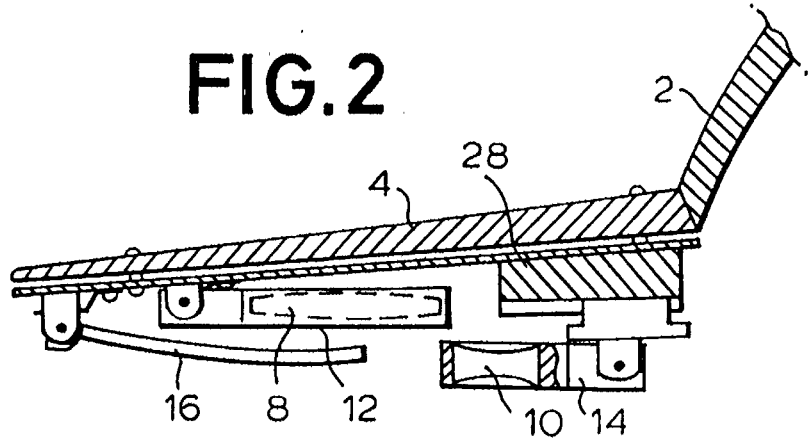
FIG. 2 shows the binocular of FIG. 1 in the folded or collapsed free and unaided vision state.
Figure 3:
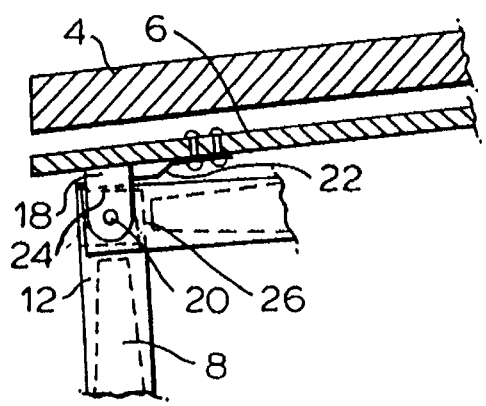
FIG. 3 is an enlarged representation of detail A of FIG. 1.

Thus, the provision of objective and eye lenses integrally formed with a transparent mounting or frame portion 12 and 14 as illustrated, inter alia, at FIGS. 1, 2, and 3, will provide a significant feature of the present invention, which increases the utility thereof and provides an advantage of reducing strain and fatigue on the user, as well as providing the user with continuity of eye contact.

Also seen in FIG. 1 is a sun shield 16 which, as shown in FIG. 1, can be interposed in the optical path of the binocular if desired (solid lines) or withdrawn therefrom (dash-dotted lines).

The shield 16, in addition to serving as a sun shield, can also serve as a laser shield according to an additional feature of the present invention. It has been noted that the present invention is usable both outdoors for, as noted above, sporting and other events, as well as indoors in industrial, medical/surgical or research environments. In each of these environments, laser light is often present, and it is thus important, in addition to providing a selectively usable magnifying mechanism for the user, to also provide laser protective shields as an integral portion of the binocular of the present invention.

It is well known that misdirected laser light, or even a reflection of such light can cause serious eye damage. Such laser shields would find utility in medicine, where laser surgery is quickly becoming, if it has not already become commonplace; at universities and other venues of scientific research; and in the industrial sector, where laser equipment is commonly used in manufacturing, inspection and other processes.

As such, a shield, similar to the shield 16, can be manufactured of a laser absorbing resin, or with a laser reflective coating to provide eye protection for the user. The use of a laser absorbing resin to form the laser shield provides the advantage that such shields will not lose efficiency even if the shield is scratched. Of course, particular laser wavelengths will require dyes effective in shielding those wavelengths.

Such laser light absorbing filters, resins, and dyes are available, for example, under the trademark FILTRON by Gentex of Carbondale, Pa.

Laser reflective coatings can of course also be used instead of laser light absorbing resins to provide the shielding function. Thus, a single shield can provide both laser light and sunlight shielding functions.

It is contemplated that the primary utilization of such a laser light shielding function would be when the binocular of the present invention is utilized for interior use, while the sun shielding function would be utilized when the binocular is utilized for exterior use. However, it has also within the contemplation of the present invention that the laser shields can also be utilized for exterior use, such as for protection in various military environments.

A characteristic feature of the binocular according to the invention is the collapsibility or foldability of its optical systems, whereby free and unaided vision is easily and quickly achieved without removing the cap, by simply folding the system's components out of the way, as shown in FIG. 2. Use of the binocular for aided vision is easily and rapidly resumed by snapping the components into the positions shown in FIG. 1.

Means are thus required, and are provided, to define, prior to the use of the binocular, and maintain during its use, the alignment or collinearity of the optical axes of the optical components of each of the two optical systems. This, in the present embodiment, is achieved by means of a mechanism, such as a well-known mechanical flip-flop device, which can be seen to better advantage in FIG. 3. This mechanism includes a fork-like bracket 18 mounted on the base plate 6, to which bracket is hingedly articulated the frame 12 of the two objective lenses 8.

The frame 12 can thus swivel about the pivot 20 mounted in the bracket 18. The two positions of the frame 12, namely, the operational position of FIG. 1 and the folded position of FIG. 2, are defined by a flat spring 22 of a cranked shape (FIG. 3), one end portion of which is fixedly attached to the base plate 6. In the operational position of the frame 12, the other, free end portion of the spring 22 presses against the upper end face 24 of the frame 12. On the other hand, the folded position is defined by the free end portion of the spring 22 pressing against the lateral surface 26 of the frame 12. The two positions are attained by manually urging the frame 12 in the desired direction. After overcoming the resistance of the spring 22 beyond a certain point, the frame 12 will snap into either the folded or operational position.

The same bi-stable feature is also provided for the frame 14 which incorporates the eye lenses 10, or for the sun/laser shield 16 (FIG. 1). The latter has, in fact, three stable positions: the position of use as seen in FIG. 1; the folded-down position as shown in FIG. 2, and the raised position, indicated by dash-dotted lines in FIG. 1, when the shield 16 is not wanted for viewing. Of course, it is understood that the sun/laser shield can be used when the binocular is in the folded position. The pivots 20 enable the objective lenses and eye lenses to swivel or pivot about axes extending in planes parallel to the corneal plane of a user's head.

Figure 4:
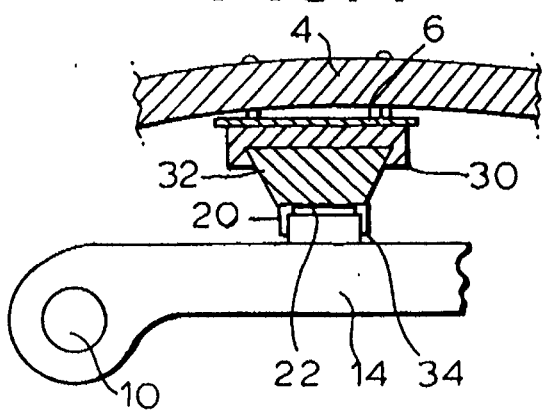
FIG. 4 is a view in cross-section along plane IV—IV of FIG. 1.

Another feature of this embodiment is the adjustability of the distance between the objective lens 8 and the eye lenses 10, that is, the so-called diopter adjustment, to suit the individual user. The arrangement (FIG. 4) includes a block 28 attached to the base plate 6 and comprising a female dovetail 30 in which is slidingly accommodated a male dovetail 32. To the latter is attached a fork-like bracket 34, which also carries the flat spring 22, the purpose and effect of which was explained in conjunction with the objective lens 8.

Figure 5:
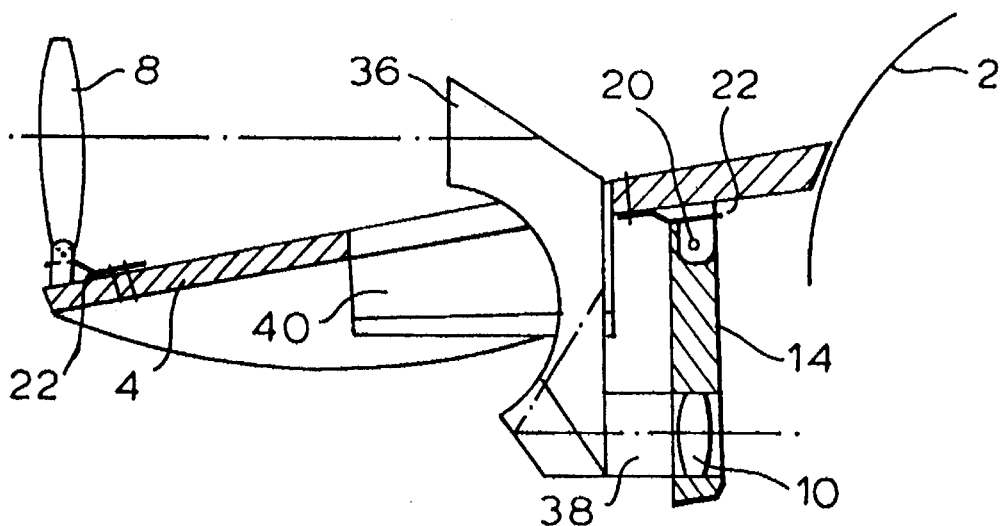
FIG. 5 represents another embodiment of the invention, being a terrestrial binocular with a roof prism as erector, in the operational state.
Figure 6:
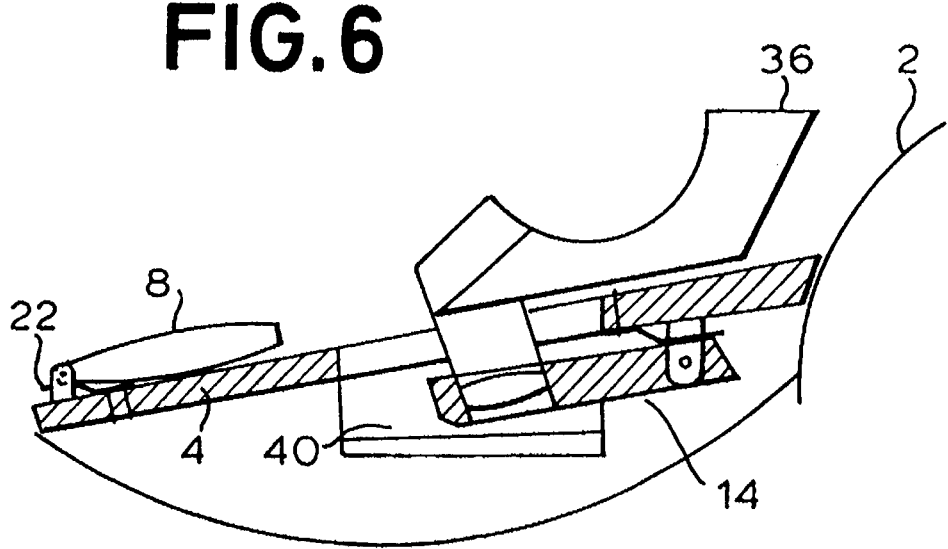
FIG. 6 shows the binocular of the embodiment of FIG. 5 in the collapsed state.

The embodiment shown in FIGS. 5 and 6 is of the terrestrial type, having objective lenses 8 and eye lenses 10 which are both positive and, therefore, need an erecting element for each of the two systems. The erecting element in this particular case, is a roof prism 36 of the Leman type, which can also be formed of plastic.

As can be seen in FIG. 5, the erecting prism 36 is attached to the frame 14 of the two eye lenses 10 by means of an optical coupling element 38, with the optical axis of the system indicated by a dash-dotted line.

For each of the two systems, an aperture 40 is provided in the visor 4, through which the prism 36 protrudes during use, and through which the entire prism 36 can be moved to the upper side of the visor 4 when the binocular is to be collapsed after use (see FIG. 6), or when the eye lenses 10 are to be temporarily swung out of the way for free vision. For the latter purpose (i.e., for free and unaided vision), it is not necessary to fold down the objective lens 8, as it is mounted on top of the visor 4 and thus does not interfere with free vision. Of course, to achieve a small compact unit for storage and the like, both the objective lens 8 as well as the prism and eyelens can be moved to the collapsed position, as shown in FIG. 6.

The above-mentioned flip-flop mechanism comprising the flat springs 22 is also provided in this embodiment and ensures proper relative orientation and stability of the optical components in the unfolded, operational state, as well as the stability of these components in the compacted, collapsed state of the binocular.

The relatively large eye-relief of this type of optical system is particularly advantageous for wearers of spectacles, as it allows larger distances between the eyepiece lens and the user's eye. This allows the user to continue to use the binocular of the present invention while wearing eyeglasses, thus increasing the utility of the present invention. Of course, all embodiments of the present invention can be used while wearing eyeglasses and adequate space is provided between the eyelens and the user's eyes to accommodate a pair of eyeglasses.

The binocular of the embodiment illustrated in FIG. 7 has similar optical systems to that of FIGS. 5 and 6, each being a terrestrial telescope with a Leman roof prism for an erector element. However, as opposed to the embodiments of FIGS. 5 and 6, the prism 36 and the eyelens 10 of each system are not raised upwards to obtain free, unaided vision, but are swung sideways by swiveling them about a pivot 42, which is part of a block 44, to which the prism 36 is cemented. A slot 46 is provided in the visor 4 for each prism 36, long enough for the lower end thereof to be swung out of the field of view of the user's eyes. The pivot 42, the axis of which is collinear with the optical axis of the objective lens 8, is rotatably mounted in a bracket 48 fixedly attached to the visor 4. Means (not shown) are provided to axially retain the pivot 42 in the bracket 48 and to produce a sufficient amount of friction to stabilize the instantaneous swivelled position of the prism unit.

A significant advantage of this swivel feature resides in the fact that by swiveling the prisms 36, the distance between the eye lenses 10 (which are advantageously cemented to the lower portions of the prisms 36) can be made to match the interpupillary distance of the user, which greatly enhances binocular vision and reduces eye strain.

As with the previous embodiment, the slots 46 are of sufficient length to enable the prisms 36 to be swung out of the user's field of view when unaided vision is desired.

Figure 9:
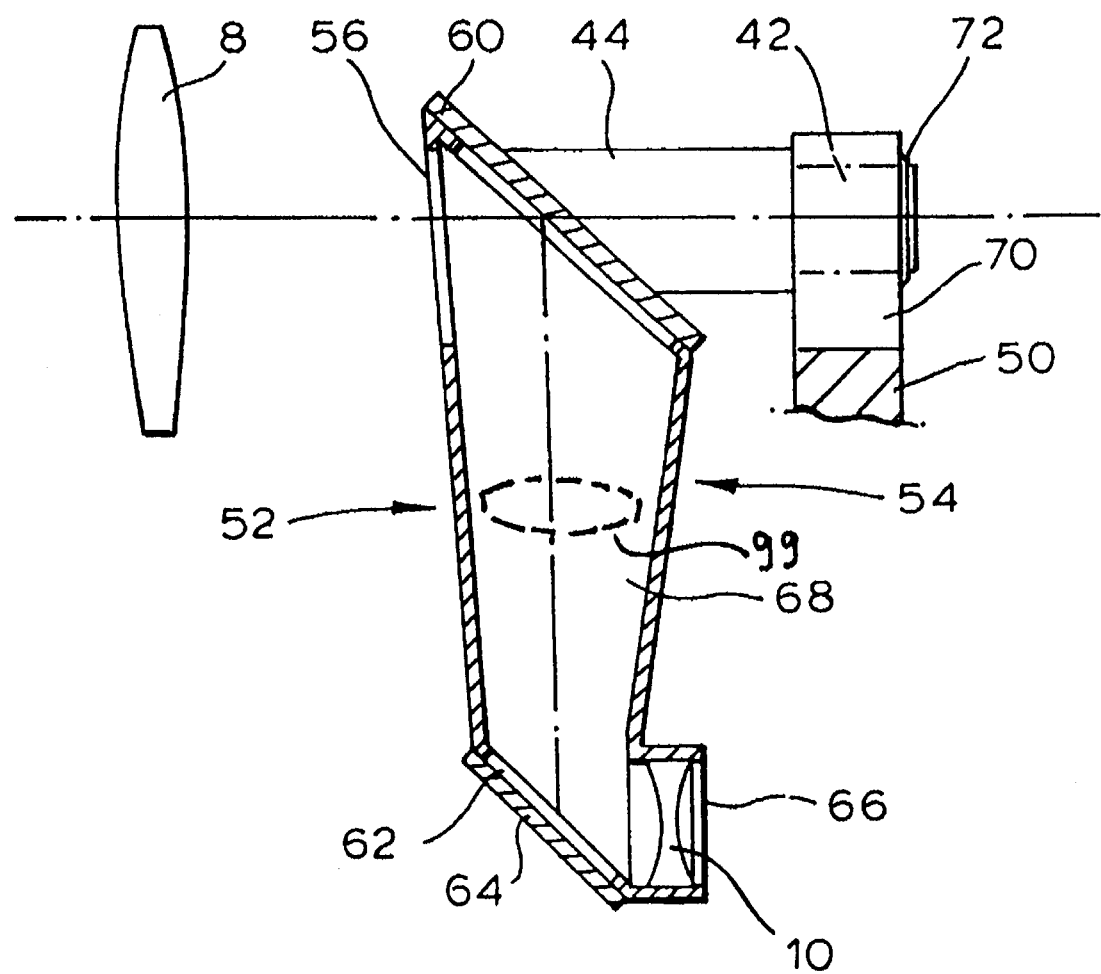
FIG. 9 is an enlarged, cross-sectional view of the periscope-like structure of FIG. 8.

A further embodiment incorporating the swiveling feature of the previous embodiment is the visor-mounted binocular of FIGS. 8 and 9, except that the latter relates to a Galilean-type binocular and the swiveling, axis-displacing element is not a prism, but a periscope-like structure using plane mirrors.

FIG. 8 shows a cap 2 and a visor 4, to the underside of which is attached a T-shaped base plate 6. To the upright leg of the T-shaped plate, a bracket is attached to which the frame 12 of the objective lenses 8 is hingedly articulated. Also mounted on this part of the base plate 6 is the earlier-mentioned flip-flop spring 22 (not shown), which permits the frame 12 to assume either the upright, operational position shown in the drawing, or a folded-down position. The cross bar of the T-shaped base plate carries two posts 50. The latter support the already mentioned periscope-like axis-displacing element 52 shown to better advantage in FIG. 9.

FIG. 9 illustrates a tapering housing 54 having a front wall with an entrance aperture 56, a ceiling aperture 58 covered by a top mirror 60, a bottom aperture 62 covered by a bottom mirror 64 and a rear wall with an exit aperture 66 in which the negative eyelens 10 is mounted. The sidewalls 68 are fully closed.

The mirrors 60 and 64 are advantageously first-surface mirrors to avoid double reflection. To the top mirror 60, which is fixedly attached to the housing 54, there is cemented a block 44 ending in a pivot 42, the geometrical axis of which is collinear with the optical axis of the objective lens 8 and parallel to the optical axis of the eyelens 10. The two mirrors 60 and 64 are parallel to each other and are each inclined with respect to the optical axes by an angle of 45°. The pivot 42, rotatably seated in a bore 70 of the post 50, is maintained in its axial position by a retaining washer 72. The friction force necessary to hold the periscope element 52 in any position of swivel is produced by slotting the post 50 to a predetermined depth, to make it elastically deformable. The slots 74 are clearly seen in FIG. 8.

Swiveling of the periscopic elements 52 for the purposes of (a) matching of interpupillary distance of a user; (b) swiveling the elements 52 out of the field of view of the user for unaided vision, and (c) compacting the binocular after use, is facilitated by appropriately shaped and located slots 46.

Further provided is a visor-like sun/laser shield 16 articulated at both its ends to the edge of the cap visor 4 by means of pivots 76 and having two defined positions: a lower protective position which is that shown and in which it is maintained by a projection 78, and an upper position in which it is held by a catch (not shown) at the inside of the shield 16.

The sun/laser shield can advantageously be further provided side panels to protect the user from sunlight or laser light directed towards the user from the sides. Such side panels can advantageously be pivotally mounted to the shield 16 or can be formed by an integral downwardly extension of the side portions of shield 16.

Figure 10:
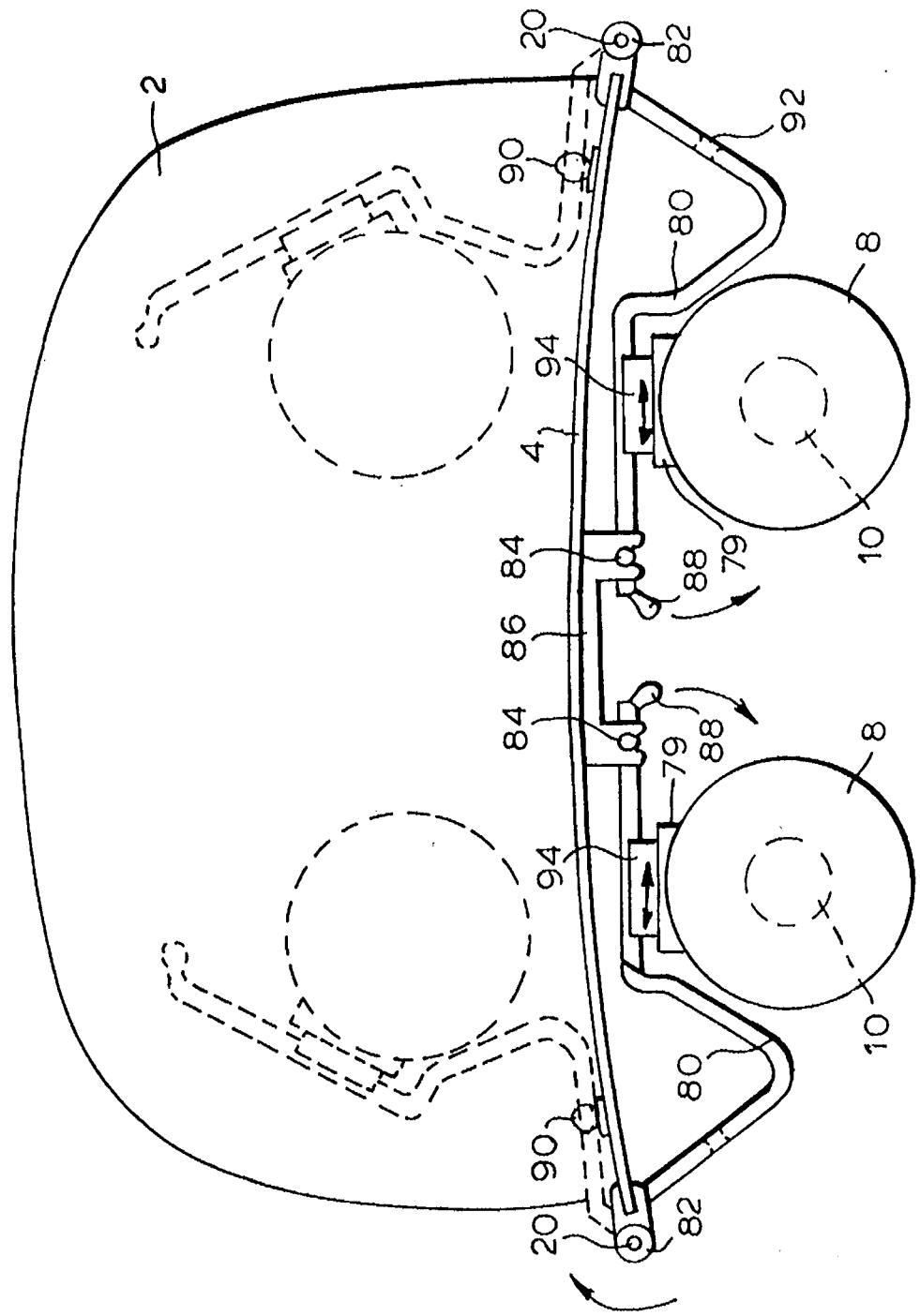
FIG. 10 illustrates yet another embodiment of the present invention in which the optical systems can be individually swung out of the way in a lateral direction.

Yet another embodiment of the present invention is shown in FIG. 10. Here, each optical system, i.e., an objective lens 8 and an eyelens 10, are rigidly mounted on a common frame 79 (or in a common tube, not shown), in proper alignment and at a preset distance. Each frame 79 is supported by an arm 80 articulated to the edge of the visor 4 by means of a hinge 82, the pivot 20 of which extends in a plane parallel to the median plane of the user's head or perpendicular to the plane of the figure or parallel to the user's axis of view. The arms 80 are held in the position indicated by solid lines, by pins 84 which are an integral part of the arms 80 and which can be pushed into, and are subsequently held by, a catch 86 fixedly attached to the visor 4.

When pulled by a handle 88, the arm 80 is released from the catch 86 and each optical system can be swung, in the directions of the arrows adjacent the handles 88, out of the way by swiveling the arm 80 sideways and onto the top of the visor 4, as indicated by dashed lines. To retain the arms in the swung-out position for as long as desired, detent means are provided in the form of a snap fastener comprising a projection 90 attached to the upper side of the visor 4, which projection 90 snaps into an appropriately placed and dimensioned hole 92 in the arm 80.

A further feature of the embodiment of FIG. 10 is the possibility of adjustment to match the user's interpupillary distance. This is made possible by attaching the frame 79 to a block 94 having a groove with a female dovetail profile and giving a portion of the arm 80 the profile of a male dovetail slidingly fitting the female dovetail of the block 94. The double arrows on the blocks 94 indicate the directions in which each of the optical systems can be shifted.

Figure 21:
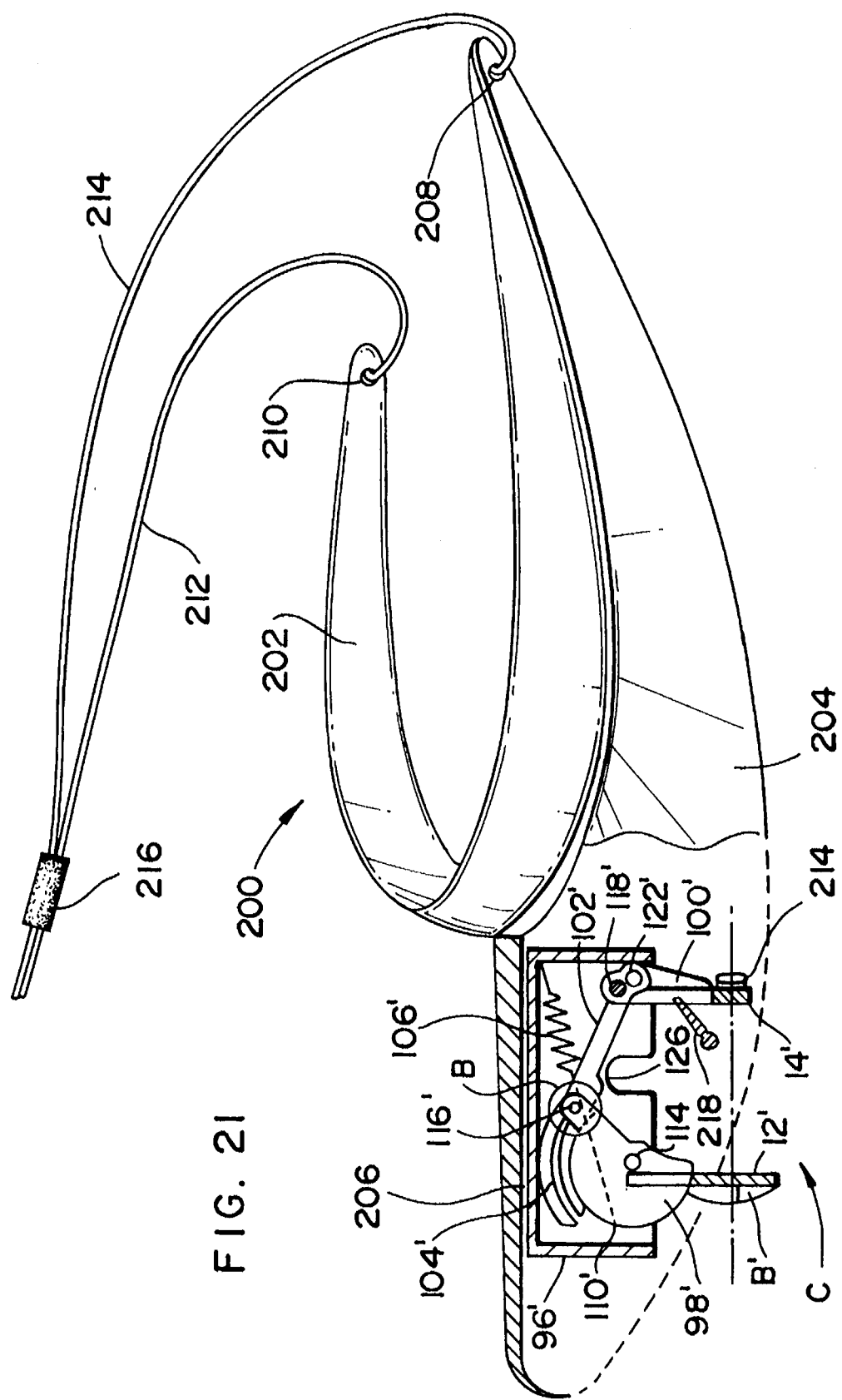
FIG. 21 shows a further embodiment of the present invention, wherein the binocular is attached to a visor and wherein the optical systems of the binocular define a microscopic viewing system.

It should be understood that the term "cap" does not necessarily imply a headgear fully covering the head, but could also refer to a visor, or a mere headband with or without coronal and/or sagittal straps attached thereto. An embodiment of the present invention applied to a visor is illustrated in FIG. 21.

While the periscopic mirror arrangement of the embodiment of FIG. 8 has the advantage of adding very little to the weight of the binocular, it could also be replaced by a rhomboid prism.

A sun/laser shield can obviously also be attached to those embodiments in which it is not shown in the drawings thereof. In addition, as previously noted, the sun/laser shields can be constructed so as to also shield the user from sunlight or laser light entering from the sides (i.e., in directions transverse to the optical axes of the optical systems).

Such side sun/laser shields can be either integral with the front sun/laser shield or can be movable (e.g., pivotable) with respect thereto.

While the erector element shown in some of the embodiments was the prism erector of the Leman type, it is clear that, with some mechanical modifications, other erector prisms, too, could be used. It is furthermore also possible to use a lens-type erector 99, as shown in dotted lines in FIG. 9.

A further embodiment of the binocular according to the invention is shown in FIGS. 11–18. This embodiment comprises a multi-bar linkage including a snap-action arrangement, functionally differing from the previous embodiments in that during folding up, or unfolding, the objective lens frame 12 will not only automatically fold up, or unfold, also the eyelens frame 14, but, since the frames 12, 14 cannot be folded simultaneously, as they would collide, will fold up the eyepiece frame 14 before the sequential folding objective lens frame 12 has been brought up. Upon unfolding, the eyelens frame 14 will unfold only after the objective lens frame 12 is safely out of the way.

The snap-action mechanism is illustrated in FIG. 11, which shows the binocular in the unfolded state, and in FIG. 17, illustrating the folded-up state thereof.

Figure 18:
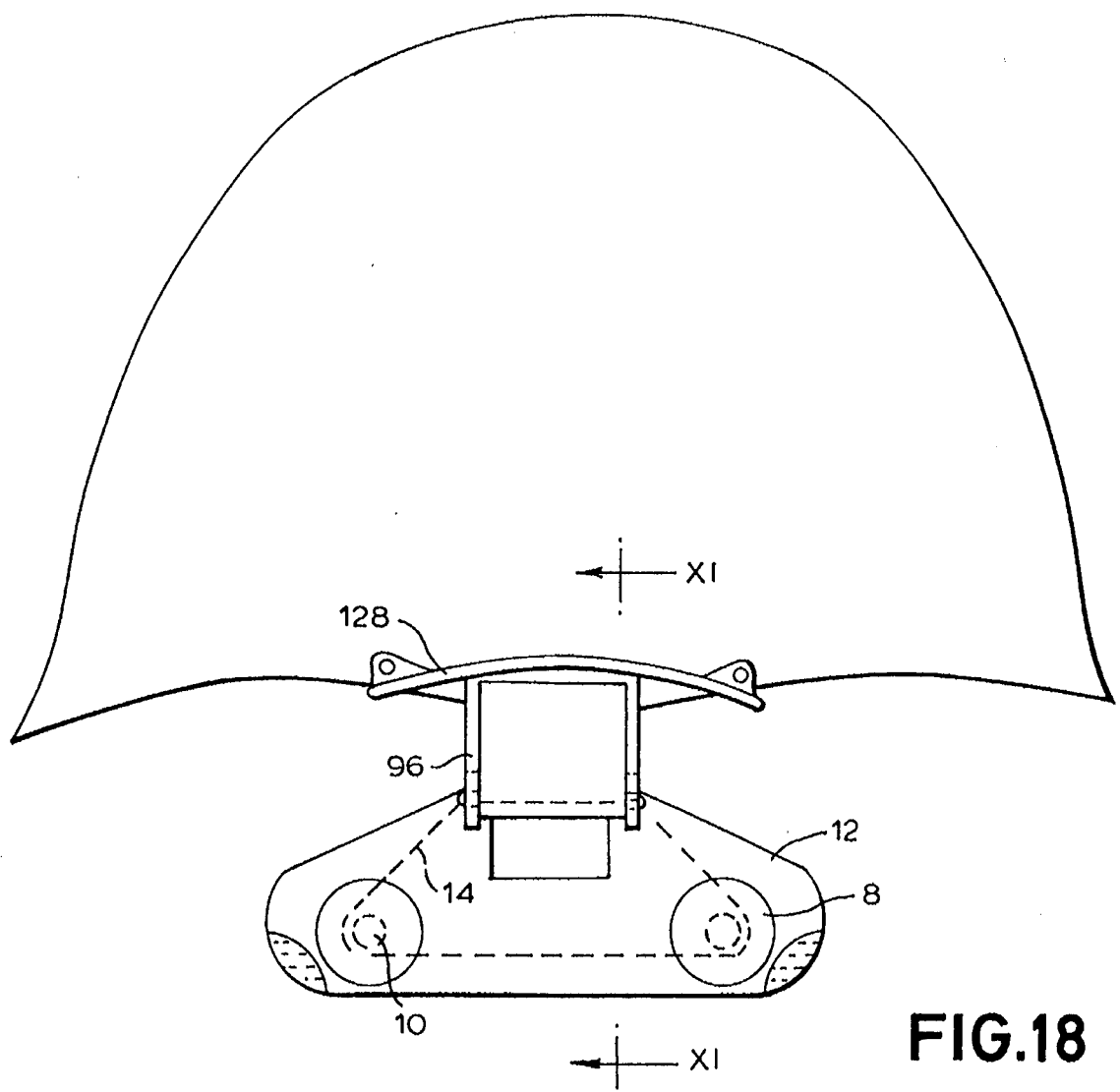
FIG. 18 shows the embodiment of FIG. 11 as mounted on a soldier's steel helmet.

There is provided a box-like housing 96 (shown in cross-section along plane XI—XI of FIG. 18), the top of which is designed to be attached to the visor of a cap, or as seen in FIG. 18, to the front rim of a soldier's or worker's (metal or plastic) helmet. Inside the housing are located the four elements that produce the above-described snap action: a drum-like member 98 to which is attached, or with which is integral, the objective lens frame 12, an arm 100 to which is attached, or with which is integral, the eyelens frame 14, a lever 102 being articulated at one end to the arm 100 and having a curved guide groove 104 at the other end, and a helical spring 106, one end of which is anchored to the housing 96 by means of a pin 108, the other end of which is attached to a pin 110 carried by the drum 98.

The drum 98 is shown in FIGS. 12 and 13, the latter being a view in a direction of arrow A.

The drum 98 is provided with two pivots 114, 114' by which it is rotatably mounted in appropriate bores in the two major walls of the housing 96.

There is further seen a projection 112 which is slotted to permit passage of the lever 102. Another, narrower, slot 113 is provided to make room for the (non-coiled) end of the spring 106 which, during snap-over from the unfolded position shown in FIG. 11, to the folded-up position shown in FIG. 17, moves (relative to the drum 98) from the left of the drum pivots 114, 114', to the right thereof. Further provided is a pin 116 extending across the slotted projection 112, which pin, for a purpose to be explained further below, rides in the guide groove 104 of the lever 102.

The arm 100 is illustrated in FIGS. 14 and 15. The arm 100, to which is attached, or with which is integral, the eyelens frame 14, is provided with two pivots 118, 118' by which it is pivotably mounted in appropriate bores in the walls of the housing 96 and with two bores 120, 120' which accommodate the hinge pin 122 (FIG. 11) by which the lever 102 is articulated to the arm 100. There is also seen a slot (or groove) 123, which accommodates the lower end of the lever 102. The non-grooved portion of lever 102 is also provided with a slot (not shown) located in the vertical center plane of the lever, for the (non-coiled) end of the spring 106 to pass through freely.

The magnified detail B of FIG. 16 shows that the groove 104 of the lever 102 is provided with two small projections 124, 124' which serve as detents retaining the pin 116 of the drum projection 112 in its position at the end of the groove 104 when pressure is applied to the edge of the objective lens frame 12 in direction of arrow C in order to fold up the frame.

Without this detent arrangement, the pin 116 of the drum projection, during folding, would simply slide along the groove 104 without affecting the eyepiece frame 14. As it is, pushing the frame 12 in direction of arrow C will (by rotating the drum 98 in the counterclockwise sense) cause the lever 102 to be pulled along and, via the hinge pin 122, to swivel the arm 10 and, thus, fold up the frame 14.

Because the distance between the pivots 118, 118' and the hinge pin 122 is much smaller than the distance between the drum pins 114, 114' and the pin 116 of the drum projection 112, a rotation of the drum 98 by a relatively small angle will cause the frame 14 to swivel upwards by about 90°, that is, until a narrow bridge member of the frame 14 (not shown) abuts against the recesses 126 in the housing walls, thus defining the uppermost swing-out position of the eyelens frame 14.

Further pressure on the objective lens frame 12 will now force the pin 116 past the detent projections 124, 124' and permit the pin 116 to freely travel along the guide groove 104. At this moment, the above-mentioned "snap action" is initiated. As the objective lens frame 12 continues to be rotated in direction of arrow C, the longitudinal axis of the spring 106, i.e., the line connecting the pins 108 and 110, begins to tilt downwards. As soon as, in its downward tilt, this connecting line passes the imaginary line connecting the pin 108 and pivot 114 of the drum 98, the system spring 106/drum 98 becomes "over-centered", and snaps through, completing the folding-up of frame 12 without further application of force.

FIG. 17 illustrates the folded binocular according to this embodiment, and FIG. 18 shows the binocular as attached to a helmet by means of a bracket 128.

Upon unfolding, pulling the objective lens frame 12 in direction of arrow D in FIG. 17 will initiate reverse snap action which takes place when, upon clockwise rotation of the drum 98, the spring arrives at the above-mentioned over-centering position, throwing the pin 116 first against the detents 124, 124', which causes the lever 102 to push the eyelens frame 14 downwards towards the unfolded position and finally forcing the pin 116 over the detents 124, 124' and against the end of the groove 104.

The final angular position of the eyelens frame 14 is defined by stop means, e.g., the lateral wall of the housing 96. This position clearly determines the unfolded position of the objective lens frame 12, defining as it does a triangle: pivot 114→pin 116, pin 116→pin 122, and pin 122→pivot 114. The lengths of the sides of this triangle have been predetermined to such effect that the respective planes of frames 12 and 14, when in the unfolded state as shown in FIG. 11, will always be parallel.

Figure 19:
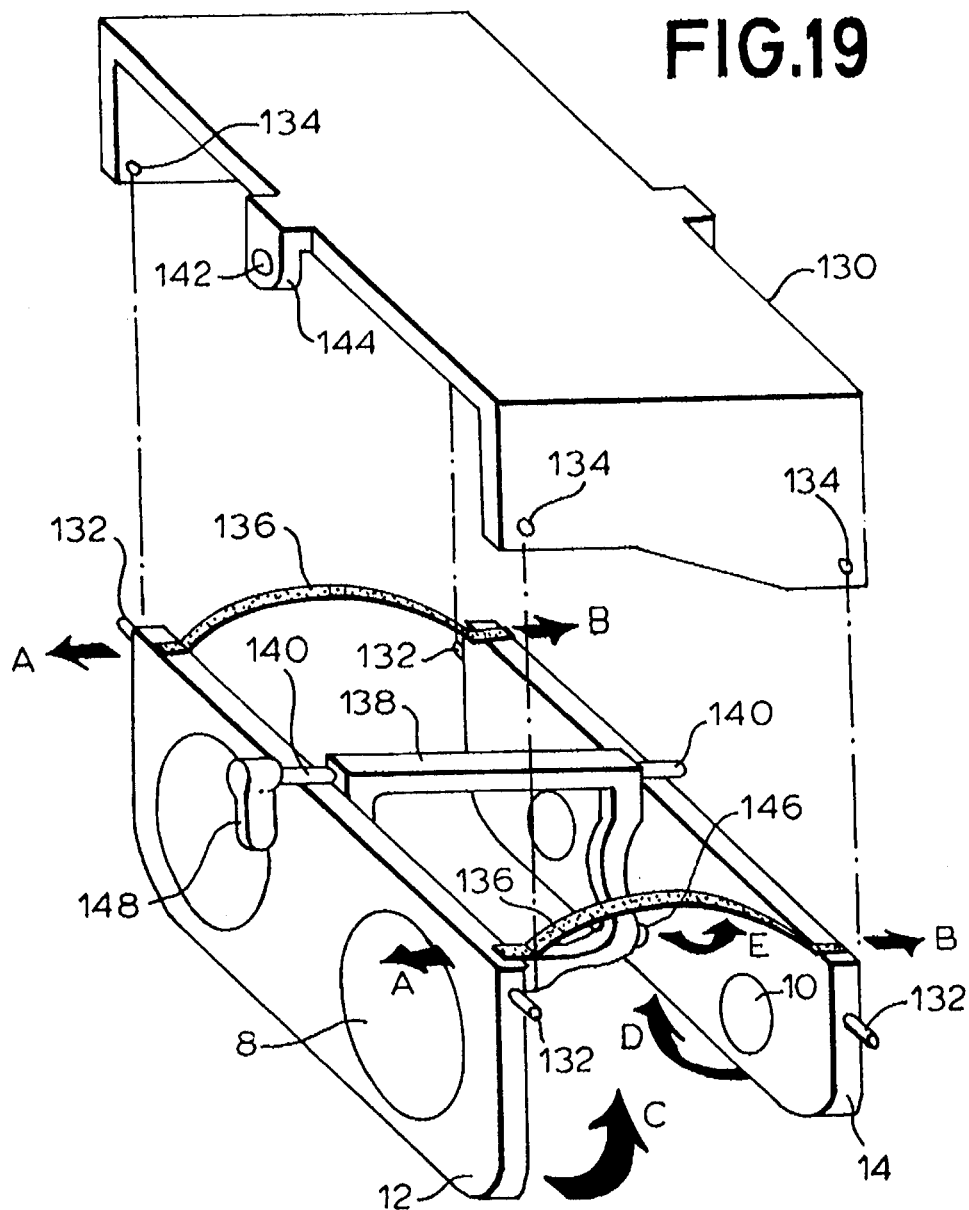
FIG. 19 is an exploded perspective view of yet another embodiment of the binocular according to the present invention.
Figure 20:
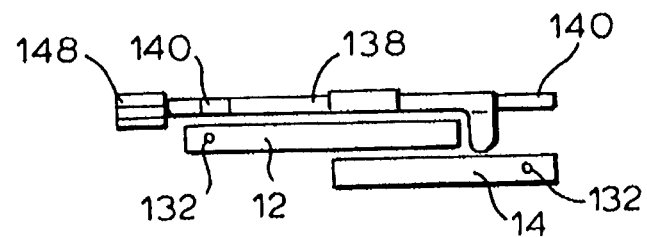
FIG. 20 shows the two lens frames in the folded position.

Yet another embodiment of the invention is shown in FIGS. 19 and 20.

There is seen a housing 130 which accommodates an objective lens frame 12 and an eyelens frame 14. These two frames are provided with pivots 132 which, in assembly, are pivotably mounted in appropriate bores 134 in the housing 130. Two flat springs 136, pressed in assembly against the "ceiling" of the housing 130, exert pressure on the frames 12, 14 in direction of arrows A, B, producing a moment about the pivots 132 and thus biasing the frames 12, 14 in direction of arrows C, D, i.e., towards the folded state shown in FIG. 20.

What keeps the two frames 12, 14 in the unfolded position, in which they must also be located in parallel planes to achieve collinearity of the optical axes of the objective lenses 8 and the eye lenses 10, is a hinged spacer 138 provided with pivots 140 mounted in bores 142 located in tongues 144 integral with the housing 130 and retained in the position shown in FIG. 19 by indexing detents in the form of, e.g., shallow recesses 146 provided in the inside surfaces of the frames 12, 14.

For collapsing the binocular, i.e., for folding up the frames 12, 14, a thumbscrew 148 is provided, permitting the spacer 138 to be swung in direction of arrow E and thus allowing the springs 136 to fold up the two frames.

For unfolding the frames 12, 14, the thumbscrew 148 is turned in the other direction, causing the spacer to spread the folded frames open. The correct position of the frames 12, 14 is ensured when the spacer 138 drops into the indexing detents 146.

While the present application has been described particularly with reference to objective and eye lenses having a single focal length, it is of course possible to embody the present invention in a binocular using bifocal optical systems. By the term "bifocal" it is meant that one portion of a lens or optical system has a first predetermined focal length while another part of the lens or optical system has a different focal length. Thus, such a lens can be utilized to enable a user to focus on objects at different distances, in a manner similar to ordinary bifocal spectacles. The dotted line on the objective lens 8' in FIG. 21 schematically illustrates an example of a boundary line between different focal length portions of the objective lens to thus define a bifocal optical system.

In particular, it is a specific feature of the present invention that, for example, a top portion of a bifocal optical system can provide a predetermined telescopic magnification while a bottom portion can provide an optical system having a lower magnification or even having no power. As an alternative to the above, it is noted that the bottom portion of the lenses (no power portion) can merely be deleted or removed, thus yielding the same result of enabling the person to obtain a telescopic view by directing his vision through the top of the lenses or obtaining an unaided view by directing his vision beneath the bottom of the lenses in the case of cut-off lenses.

This type of optical system would be useful for a driver of a car, and would enable the person to view the road with a magnification while it would enable the person to view the dashboard without magnification. Similarly, such bifocal binoculars attached to a head covering would also be useful for a surgeon and would enable the surgeon to view different parts of the operating theater with different magnifications or even unmagnified in accordance with the features of the present invention. The bifocal feature of the present invention can be embodied in either a telescopic optical system or a microscopic optical system.

In constructing the binocular optical systems of the present invention to comprise bifocal optical systems, either the objective lens, the eye lens, or both can be made into bifocal lenses. A determination of which of the lenses are to be made into bifocals can be carried out in accordance with ordinary lens design criteria and is well within the scope of one of ordinary skill in the art.

While the present invention has also been described hereinabove with respect to an optical instrument attachable to a head gear wherein the optical instrument comprises a pair of optical systems, one for each eye of the user, it is of course understood and explicitly within the scope of the present invention that a monocular (i.e., an optical system for one eye of the user) is also contemplated. In this regard, the folding and attaching means as set forth above with respect to any of the various embodiments of the present invention could be used with a monocular, which, according to the present invention, is attached to a headgear. Further, such monocular could of course be attached to be coaxial with either eye of the user and could be moved from eye to eye.

As noted previously, the present invention can be applied to a visor rather than a hat. Such an embodiment, including further alternative features of the present invention is illustrated in FIG. 21.

With reference to FIG. 21, a modified binocular attached to a head covering in the form of a visor 200 is illustrated. The optical systems and their mounting and moving structure and mechanisms utilized in the embodiment of FIG. 21 are somewhat similar to those of the embodiment illustrated in FIG. 11. In regard thereto, those components common to both embodiments are designated with the same reference numeral as in FIG. 11 with a prime added thereto. Thus, FIG. 21 illustrates, inter alia, an objective lens 8' an objective lens frame 12' an eyelens 14', a frame or housing 96', a drum-like member 98', an arm 100', a lever 102', a curved guide groove 104', a helical spring 106', pins 110' and 116', a pivot 118' and a hinge pin 122' which coact in a manner similar to the structure shown in FIG. 11.

It is further noted that the present invention is applicable to a binocular having either a telescopic optical system such as illustrated in various previous figures, as well as a microscopic optical system such as is illustrated in FIG. 21. Thus, in FIG. 21, the objective lens 8' and the eye lens 214 are such that enlarging microscope type optical systems are provided. A head covering with a microscopic binocular attached thereto will, of course, have utility in industrial assembly work, research, as well as in surgery and medical fields.

With regard to the medical field, it is noted that the present invention is intended to fill a gap between microsurgery, wherein a surgical microscope is commonly used and conventional surgery, where appropriate magnifying optics are often cemented to an ordinary eyeglass lens. In surgical applications intermediate these two areas, it is important for the surgeon to also be aware of what is going on in areas not directly central to his field of view. In other words, the surgeon should be able to occasionally glance about his peripheral field of view so as to be aware of activity in this region, and to rapidly return his attention to his central field of vision.

Also illustrated in FIG. 21 is the use of VELCRO™ attaching means 206 for detachably securing the frame 96' to the brim 204 of the visor. The headband 202 of the visor 200 is also provided at either end thereof with apertures 208, 210 within which a cord composed of sections 212, 214 and joined by an adjustment sleeve 216 is provided. The cords or straps 212, 214 enable the headgear mounted binocular to be retained about the neck of the user when not needed. The adjustment sleeve member 216 enables the length of the cords 212, 214 to be adjusted.

Also illustrated in FIG. 21 is an operating handle 218 which can be provided for the optical systems of the present invention to enable a person other than the wearer to readily move the optical systems between the aided and unaided viewing positions. For example, when the binocular of the present invention is utilized by a surgeon who does not have a free hand, the optical systems can be moved between their defined positions by another member of the operating team, such as a nurse.

Of course, the embodiment of FIG. 21 could of course be provided with a laser protective shield to protect the wearer in the event that laser light is being utilized. Such laser protective shields can be constructed in accord with any of the forms illustrated in the other embodiments. In a similar vein, the use of VELCRO™ attaching means, a handle, microscopic optical systems or the retaining straps 212, 214 are not limited to the embodiment of FIG. 21, but are equally applicable to the other disclosed embodiments. Conversely, any of the various features or optical systems of the other enclosed embodiments are also usable in the embodiment of FIG. 21, illustrating a visor with a binocular mounted thereto.

As noted previously with respect to the embodiment of FIG. 10, the headgear mountable binocular of the present invention is applicable to military helmets and for other military applications. In such environments, one could utilize the sun shield or laser shield of the present invention for a helmet mounted data display in accordance with conventional techniques.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed:

1. A binocular mountable on a headgear, said binocular comprising:

two optical systems, one for each eye of a user, each system defining an optical axis and comprising at least an objective lens and an eye lens;

means for attaching said optical systems to the headgear, said attaching means including pivot means about which, with the headgear in position on a user's head, said objective lenses and said eye lenses can be swiveled out of the way to a first position for facilitating free and unaided vision, and returned to a second position for providing binocular-aided vision; and means for mounting each said objective lens and each said eye lens of said optical systems to said attaching means, said mounting means comprising means for enabling a continuity of vision between a central field of view and a peripheral field of view in the binocular aided vision position, said mounting means comprising transparent frames integrally securing to each of said objective lenses to each other and each of said eye lenses to each other.

2. The binocular according to claim 1, said attaching means comprising a hook and loop type fastener.

3. The binocular according to claim 1, further comprising means for enabling said binocular to be worn by a user wearing eyeglasses.

4. The binocular according to claim 1, wherein the headgear to which said binocular is mountable, comprises a visor.

5. The binocular according to claim 1, wherein the headgear to which said binocular is mountable, comprises a cap.

6. The binocular according to claim 1, further including a handle extending from said optical systems to facilitate movement of said binocular between said first and second positions by a person other than a user.

7. The binocular according to claim 1, further comprising shield means for shielding a user from laser light, said shield means introducible into and removable from the optical axes of said optical systems.

8. The binocular according to claim 7, wherein said laser light shield means includes side protective shields.

9. The binocular according to claim 1, further comprising shield means for shielding a user from sunlight, said shield means introducible into and removable from the optical axes of said optical systems.

10. The binocular according to claim 1, said objective lenses and said eye lenses of said optical systems comprising plastic lenses.

11. The binocular according to claim 1, wherein said objective lenses and said eye lenses of said optical systems are mounted in lens mounts, said lens mounts comprising said mounting means.

12. The binocular according to claim 11, wherein said lens mounts are transparent.

13. The binocular according to claim 12, wherein said objective lenses and said lens mounts for said objective lenses, said eye lenses and said lens mounts for said eye lenses, are integrally molded plastic components.

14. The binocular according to claim 1, said attaching means comprising a mechanism for sequentially moving said objective lenses and said eye lenses of said optical systems between said first and second positions for enabling selection of free and unaided vision or binocular-aided vision.

15. The binocular according to claim 14, said sequential moving mechanism enabling, upon movement of one of said objective lenses and said eye lenses, automatic movement of the other of said objective lenses and said eye lenses.

16. The binocular according to claim 1, further comprising means attached to the headgear, for enabling said headgear and said optical systems to be retained about a neck of a user, when not in use.

17. The binocular according to claim 1, each of said optical systems comprising a telescopic viewing system.

18. The binocular according to claim 1, each of said optical systems comprising a microscopic viewing system.

19. The binocular according to claim 1, each of said optical systems comprising a bifocal viewing system.

20. The binocular according to claim 1, said pivot means comprising a cam groove and a follower engaged in said cam groove for swiveling said objective lenses and said eye lenses between said first and second positions.

21. A binocular mountable to a headgear, said binocular comprising:

two optical systems, one for each eye of the user, each system defining an optical axis and comprising at least an objective lens and an eye lens;

means for attaching said optical systems to the headgear, said attaching means including pivot means, about which, with the headgear in position on a user's head, said objective lenses and said eye lenses can be swiveled out of the way to a first position for facilitating free and unaided vision, and returned to a second position for providing binocular-aided vision;

means for biasing said objective lenses and said eye lenses to said first position for facilitating free and unaided vision; and a pivotally mounted spacing member, said spacing member being mounted for pivotal movement between a position in which said biasing means moves said objective lenses and said eye lenses to said first position, and a further position in which said spacing member is interposed between said objective lenses and said eye lenses to overcome said biasing means and to move said objective lenses and said eye lenses to said second position for providing binocular aided vision.

22. An optical instrument mountable on a headgear, said optical instrument comprising:

at least one optical system for an eye of a user, said optical system defining an optical axis and comprising at least an objective lens and an eye lens;

means for attaching said at least one optical system to the head gear, said attaching means comprising pivot means about which, with the headgear in position on a user's head, said objective lens and said eye lens can be swiveled out of the way to a first position for facilitating free and unaided vision, and returned to a second position for providing optical system-aided vision, said attaching means comprising a mechanism for sequentially moving said objective lens and said eye lens of said at least one optical system between said first and second positions for enabling selection of free and unaided vision or optical system-aided vision, said sequential moving mechanism comprising means for causing automatic movement of either of said objective lens or of said eye lens, upon movement of the other one of said objective lens or eye lens.

* * * * *